(12) United States Patent
Liu et al.

(10) Patent No.: US 11,005,936 B1
(45) Date of Patent: May 11, 2021

(54) SECURITY MECHANISM FOR MULTI-CLIENT ACCESS TO A SINGLE STORAGE DEVICE THROUGH A SINGLE CONTROLLER

(71) Applicant: MediaTek Inc., Hsinchu (TW)

(72) Inventors: Szu-Chi Liu, Hsinchu (TW); Liang-Yen Wang, Hsinchu (TW); Yuan-Sheng Jhu, Hsinchu (TW)

(73) Assignee: MediaTek Inc., Taiwan (CN)

( * ) Notice: Subject to any disclaimer, the term of this patent is extended or adjusted under 35 U.S.C. 154(b) by 0 days.

(21) Appl. No.: 16/813,735

(22) Filed: Mar. 10, 2020

(51) Int. Cl.
| | |
|---|---|
| *H04L 12/00* | (2006.01) |
| *H04L 29/08* | (2006.01) |
| *H04L 29/06* | (2006.01) |
| *G06F 3/06* | (2006.01) |

(52) U.S. Cl.
CPC .......... *H04L 67/1097* (2013.01); *G06F 3/067* (2013.01); *G06F 3/0631* (2013.01); *G06F 3/0635* (2013.01); *H04L 67/42* (2013.01)

(58) Field of Classification Search
CPC ... H04L 67/1097; H04L 67/42; G06F 3/0631; G06F 3/0635; G06F 3/067
USPC .................. 709/202, 203; 707/783–788, 812
See application file for complete search history.

(56) References Cited

U.S. PATENT DOCUMENTS 8,595,507 B2 * 11/2013 Panchapakesan ............................ H04W 12/0401
713/184
2019/0230161 A1 * 7/2019 Romem .................. G06F 16/00

* cited by examiner

*Primary Examiner* — Frantz Coby
(74) *Attorney, Agent, or Firm* — Han IP PLLC; Andy M. Han

(57) ABSTRACT

Examples and techniques pertaining to a security mechanism for multi-client access to a single storage device through a single controller are described. A controller receives a request from a first client of a plurality of clients to access a storage device which stores data associated with the plurality of clients. The controller determines one or more aspects with respect to the first client. The controller then performs one of a plurality of operations including: (a) granting the first client access the storage device responsive to a positive result of the determining, and (b) rejecting the request responsive to a negative result of the determining. The storage device is divided into a plurality of partitions to store respective data associated with each of the plurality of clients in one or more respective partitions of the plurality of partitions.

20 Claims, 5 Drawing Sheets

(A)

(B)

SECURITY MECHANISM FOR MULTI-CLIENT ACCESS TO A SINGLE STORAGE DEVICE THROUGH A SINGLE CONTROLLER

TECHNICAL FIELD

The present disclosure is generally related to access to storage devices and, more particularly, to a security mechanism for multi-client access to a single storage device through a single controller.

BACKGROUND

Unless otherwise indicated herein, approaches described in this section are not prior art to the claims listed below and are not admitted as prior art by inclusion in this section.

In current mobile design such as cellular phones, security application issues become more and more important. There is an increasing need for an independent storage element to protect highly confidential information. Additionally, in a multi-client system (e.g., a multi-user and/or multi-operating system (OS) system), some critical commands can only be accessed by a supervisor. Referring to part (A) of FIG. 5, in a conventional approach, when a system needs an independent storage block for special purpose(s), a dedicated secure element is used to ensure that the storage element is only accessible by a special client. Referring to part (B) of FIG. 5, in another conventional approach, multiple storage elements and multiple access controllers are used to provide separate storage for multiple clients. However, a security element tends to be expensive in a system-on-chip (SOC) application. Therefore, there is a need for a solution to control multi-client access to a single storage device through a single host controller interface (HCI).

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions, schemes, concepts, methods and apparatus pertaining to a security mechanism for multi-client access to a single storage device through a single controller (e.g., HCI). In particular, the present disclosure aims to provide a cost-effective solution that uses a HCI to control access to a storage device by multiple clients.

In one aspect, a method may involve a controller receiving a request from a first client of a plurality of clients to access a storage device which stores data associated with the plurality of clients. The method may also involve the controller determining one or more aspects with respect to the first client by: (i) verifying an identity of the first client, (ii) verifying a command indicated in the request, and (iii) verifying a logical unit number (LUN) indicated in the request. The method may further involve the controller performing one of a plurality of operations including: (a) granting the first client access the storage device responsive to a positive result of the determining, and (b) rejecting the request responsive to a negative result of the determining. The storage device may be divided into a plurality of partitions to store respective data associated with each of the plurality of clients in one or more respective partitions of the plurality of partitions. At least one of the plurality of clients may be a special client and at least one of the plurality of clients may be a regular client. Respective data associated with the special client may be accessible by the special client but not by other clients of the plurality of clients, and wherein respective data associated with the regular client may be accessible by the regular client and one or more other clients of the plurality of clients.

In one aspect, an apparatus may include a controller. The controller may include a user access control circuit and a user partition control circuit. During operation, the controller may receive a request from a first client of a plurality of clients to access a storage device which stores data associated with the plurality of clients. The controller may also determine one or more aspects with respect to the first client. For instance, the user access control circuit may verify an identity of the first client and a command indicated in the request, and the user partition control circuit may verify a LUN indicated in the request. The controller may further perform one of a plurality of operations including: (a) granting the first client access the storage device responsive to a positive result of the determining, and (b) rejecting the request responsive to a negative result of the determining. The storage device may be divided into a plurality of partitions to store respective data associated with each of the plurality of clients in one or more respective partitions of the plurality of partitions. At least one of the plurality of clients may be a special client and at least one of the plurality of clients may be a regular client. Respective data associated with the special client may be accessible by the special client but not by other clients of the plurality of clients, and wherein respective data associated with the regular client may be accessible by the regular client and one or more other clients of the plurality of clients.

It is noteworthy that, although description provided herein may be in the context of certain storage technology such as UFS, the proposed concepts, schemes and any variation(s)/derivative(s) thereof may be implemented in, for and by other storage technologies. Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED
IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
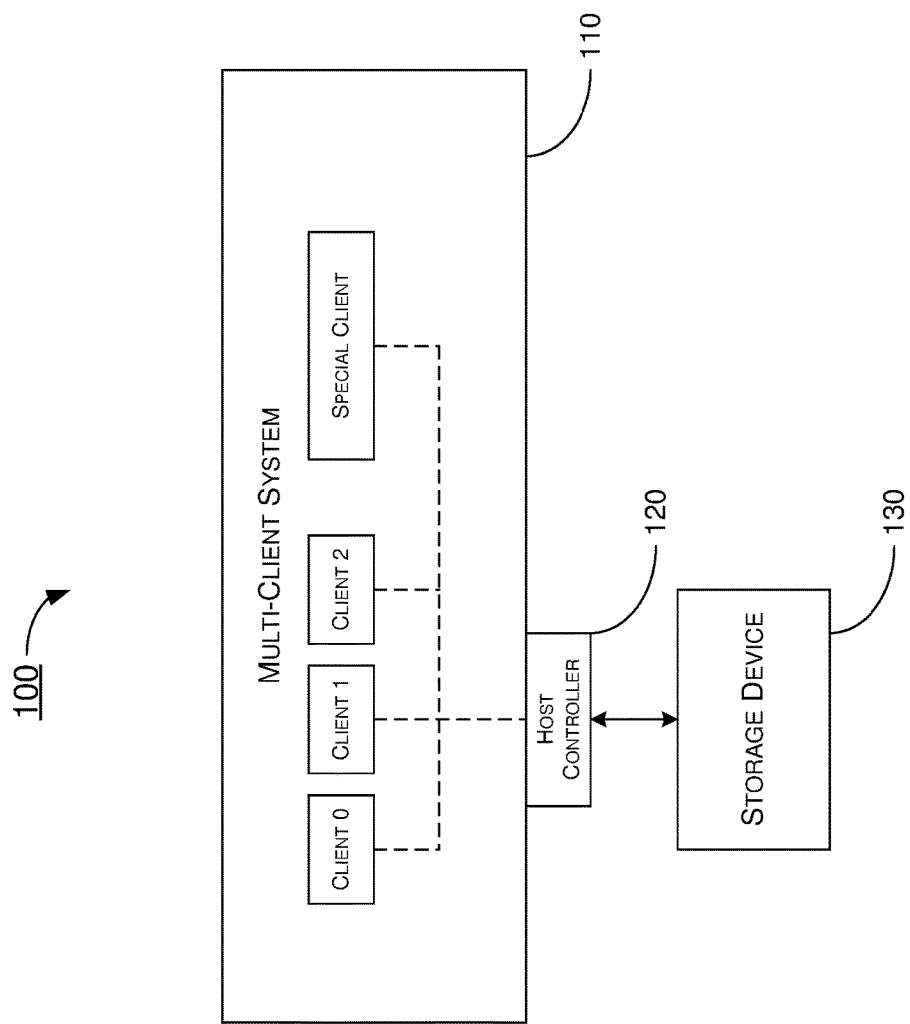
FIG. 1 is a diagram of an example environment in which various proposed schemes in accordance with the present disclosure may be implemented.

FIG. 1 illustrates an example environment 100 in which various proposed schemes in accordance with the present disclosure may be implemented. Referring to FIG. 1, environment 100 may involve a multi-client system 110, a single host controller 120 and a single storage device 130. Multi-client system 110 may include a plurality of clients which may be a plurality of users and/or a plurality of operating systems (OSs). That is, each client of the plurality of clients of multi-client system 110 (represented by "client 0", "client 1" and "client 2" in FIG. 1) may be a user (operator) or an OS. Moreover, each client of the plurality of clients may be a regular client or a special client. Under various proposed schemes in accordance with the present disclosure, as described below, each the clients of multi-client system 110 may access storage device 130 through host controller 120 to read, write, delete and/or modify data stored in storage device 130.

Under the various proposed schemes, storage device 130 may be divided or otherwise partitioned into a plurality of partitions to store respective data associated with each of the plurality of clients of multi-client system 110 in one or more respective partitions of the plurality of partitions. That is, each client of multi-client system 110 may store respective data in one or more corresponding partitions of the plurality of partitions. Under the various proposed schemes, at least one of the plurality of clients may be a special client while at least one of the plurality of clients may be a regular client. The access privileges in accessing storage device 130 may differ between a special client and a regular client. For instance, respective data associated with the special client may be accessible only by the special client but not by other clients of the plurality of clients of multi-client system 110. In contrast, respective data associated with the regular client may be accessible by the regular client and one or more other clients (including the special client) of the plurality of clients of multi-client system 110. Under the various proposed schemes, storage device 130 may also be accessed through host controller 120 by a supervisor which may be a user with administrative privileges which regular client(s) and special client(s) of multi-client system 110 do not have.

Illustrative Implementations

Figure 2:
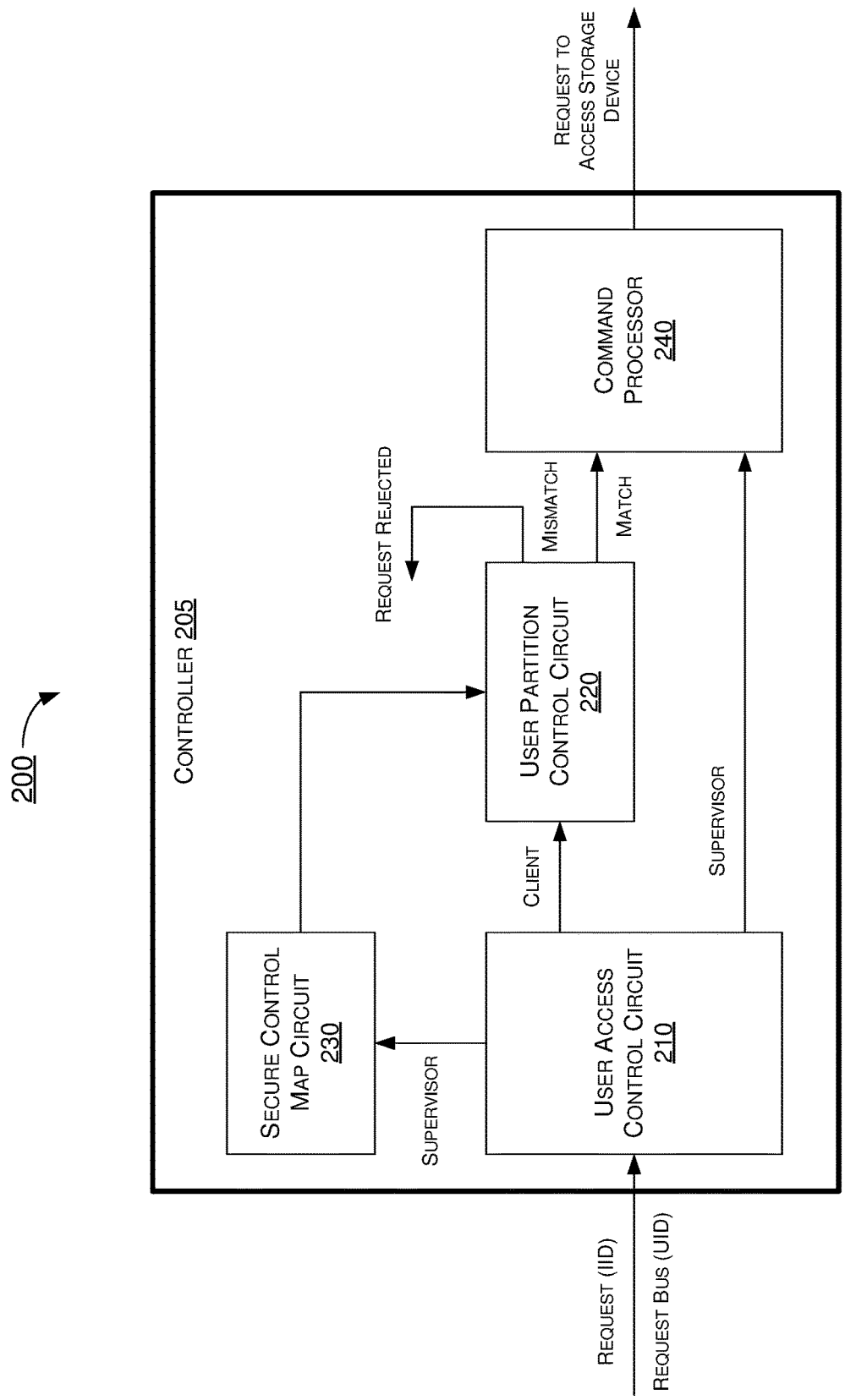
FIG. 2 is a block diagram of an example apparatus in accordance with an implementation of the present disclosure.
Figure 3:
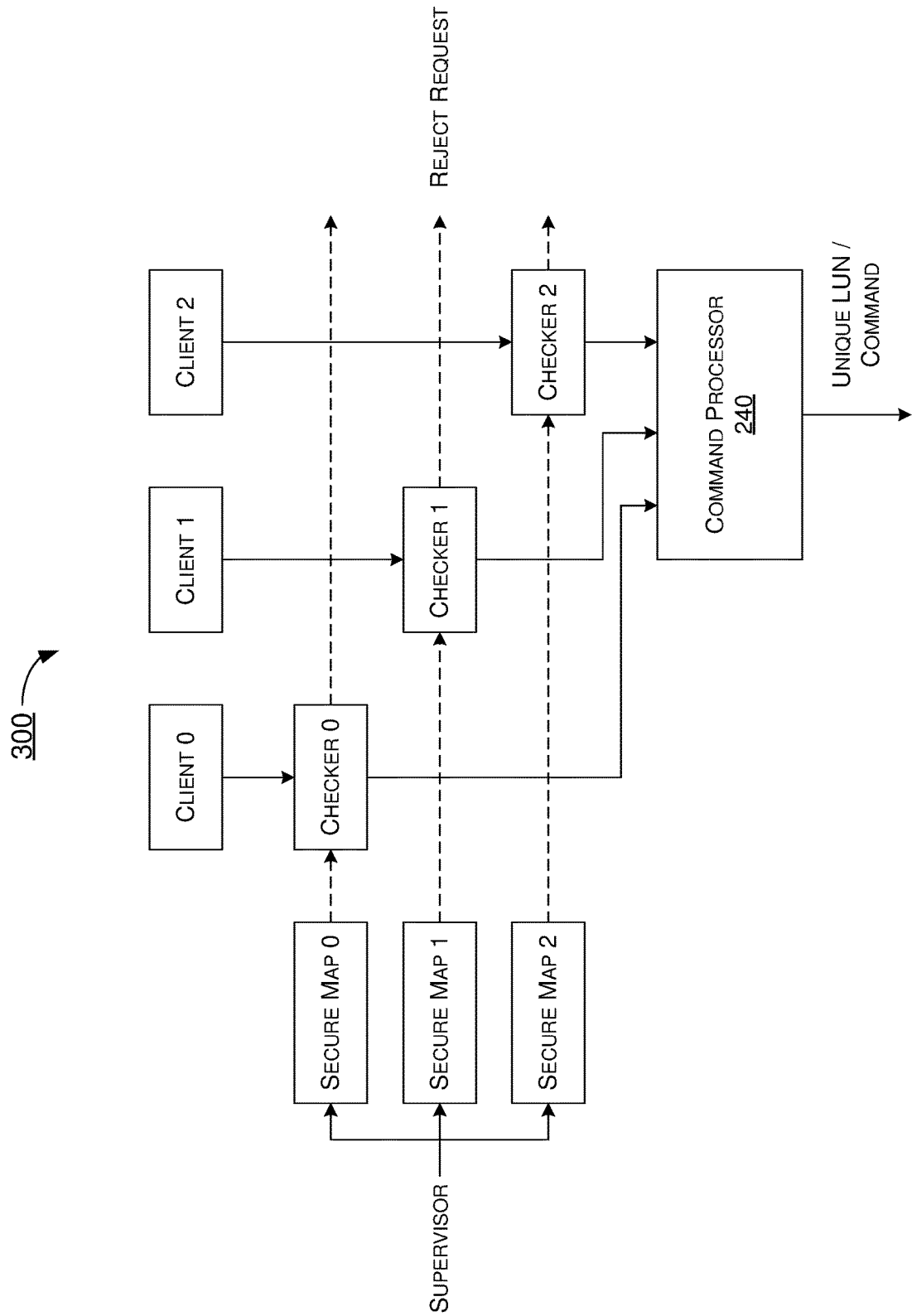
FIG. 3 is a diagram of an example scheme in accordance with an implementation of the present disclosure.

FIG. 2 illustrates an example apparatus 200 in accordance with an implementation of the present disclosure. FIG. 3 illustrates an example scheme 300 in accordance with an implementation of the present disclosure. The following description is provided with reference to both FIG. 2 and FIG. 3.

Apparatus 200 may perform various functions and/or operations to implement schemes, techniques, processes and methods described herein pertaining to a security mechanism for multi-client access to a single storage device through a single controller, including those described above with respect to environment 100 as well as scheme 300 and process 400 described below. Apparatus 200 may be a part of an electronic apparatus, which may be a wireless communication device, a computing apparatus, a portable or mobile apparatus, or a wearable apparatus. For instance, apparatus 200 may be implemented in or as host controller 120 in environment 100. Alternatively, apparatus 200 may be implemented in the form of one or more integrated-circuit (IC) chips such as, for example and not limited to, one or more single-core processors, one or more multi-core processors, or one or more complex-instruction-set-computing (CISC) processors.

In the context of a host controller, apparatus 200 may include one or more of the components shown in FIG. 2, such as a controller 205. Controller 205 may include a user access control circuit 210, a user partition control circuit 220, a secure control map circuit 230, and a command processor 240.

Apparatus 200 may be implemented in the form of one or more single-core processors, one or more multi-core processors, or one or more CISC processors. That is, apparatus 200 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 310 is a special-purpose machine specifically designed, built and configured to perform specific tasks pertaining to a security mechanism for multi-client access to a single storage device through a single controller in accordance with the present disclosure. In some implementations, each of user access control circuit 210, user partition control circuit 220, secure control map circuit 230, and command processor 240 of controller 205 of apparatus 200 may be implemented in hardware with electronic components as electronic circuitry.

Under a proposed scheme in accordance with the present disclosure pertaining to a security mechanism for multi-client access to a single storage device through a single controller, controller 205 of apparatus 200 may perform various operations. For instance, user access control circuit 210 of controller 205 may receive a request from a first client (e.g., any of client 0, client 1 or client 2) of a plurality of clients of multi-client system 110 to access storage device 130 which stores data associated with the plurality of clients. Moreover, user access control circuit 210 may determine one or more aspects with respect to the first client. Furthermore, controller 205 may perform one of a plurality of operations based on a result of the determining. For instance, responsive to a positive result of the determining, user partition control circuit 220 may grant the first client access storage device 130. Conversely, responsive to a negative result of the determining, user partition control circuit 220 may reject the request.

Under the proposed scheme, in determining the one or more aspects with respect to the first client, controller 205 may perform certain operations. For instance, user access control circuit 210 may verify an identity of the first client. Additionally, user access control circuit 210 may verify a command indicated in the request. Furthermore, user partition control circuit 220 may verify a logical unit number (LUN) indicated in the request.

In some implementations, in verifying the identity of the first client, user access control circuit 210 may perform certain operations. For instance, user access control circuit 210 may identify a user identification (UID) corresponding to a bus address of a bus of a plurality of buses through which the request is received. Additionally, user access control circuit 210 may identify an initiator identification (IID) which is associated with the first client and indicated in the request. Moreover, user access control circuit 210 may compare the UID and the IID. Furthermore, based on a result of the comparing, user access control circuit 210 may either: (a) determine that the identity of the first client is correct responsive to a match between the UID and the IID, or (b) determine that the identity of the first client is incorrect responsive to a mismatch between the UID and the IID.

In some implementations, in verifying the command indicated in the request, user access control circuit 210 may perform certain operations. For instance, user access control circuit 210 may verify whether the command is among one or more permitted commands associated with the first client. Moreover, based on a result of the verifying, user access control circuit 210 may either: (a) determine that the command is permitted responsive to the command being one of the one or more permitted commands associated with the first client, or (b) determine that the command is not permitted responsive to the command not being one of the one or more permitted commands associated with the first client.

In some implementations, in verifying the LUN, user partition control circuit 220 may perform certain operations. For instance, under scheme 300, user partition control circuit 220 may select a first checker from a plurality of checkers (e.g., checker 0, checker 1 and checker 2 in FIG. 3) which is associated with the first client. Additionally, user partition control circuit 220 may compare, using the first checker, the LUN with a first secure map of a plurality of secure maps (e.g., secure map 0, secure map 1 and secure map 2 in FIG. 3) which is associated with the first client. In some implementations, each secure map of the plurality of secure maps may be unique to a respective one of the plurality of clients.

In some implementations, in verifying the LUN, user partition control circuit 220 may perform additional operations. For instance, user partition control circuit 220 may determine whether one of the plurality of partitions indicated by the LUN corresponds to one or more respective partitions of the plurality of partitions accessible by the first client. Moreover, based on a result of the comparing, user partition control circuit 220 may either: (a) determine that access to storage device 130 by the first client is to be granted responsive to a match between the LUN and the first secure map, or (b) determine that access to storage device 130 by the first client is to be rejected responsive to a mismatch between the LUN and the first secure map.

In some implementations, controller 205 may perform additional operations. For instance, controller 205 may create the plurality of secure maps for the plurality of clients with each of the secure maps being unique to a respective one of the plurality of clients. Furthermore, controller 205 may store the plurality of secure maps in secure control map circuit 230. In some implementations, secure control map circuit 230 may include a set of registers (e.g., 32-bit registers) with each register storing a corresponding secure map of the plurality of secure maps.

In some implementations, in determining the one or more aspects with respect to the first client, user access control circuit 210 may determine that the first client is a supervisor which has administrative privilege. Correspondingly, in performing the one of the plurality of operations, controller 205 may perform certain operations. For instance, user access control circuit 210 may receive one or more commands from the supervisor. Additionally, user access control circuit 210 may allow the supervisor to modify one or more secure maps of the plurality of secure maps stored in secure control map circuit 230 based on the one or more commands.

Referring to FIG. 3, under scheme 300, the supervisor may access and modify one or more of the plurality of secure maps (e.g., secure map 0, secure map 1 and secure map 2). Accordingly, by modifying secure map(s), the supervisor may alter accessibility or access privileges associated with one or more clients of the plurality of clients of multi-client system 110. As each secure map of the plurality of secure maps may be unique to a respective one of the plurality of clients and, accordingly, a first secure map (e.g., any of secure map 0, secure map 1 and secure map 2) of the plurality of secure maps may be used to verify the LUN. As shown in FIG. 3, each client may be verified using a corresponding checker of a plurality checkers (e.g., client 0 being verified with secure map 0 using checker 0, client 1 being verified with secure map 1 using checker 1, and client 2 being verified with secure map 2 using checker 2). Upon a positive result from the verification, the LUN and command in the request from a client (e.g., the first client) may be provided to command processor 240 for processing with respect to accessing storage device 130. Otherwise, upon a negative result from the verification, the request may be rejected.

In some implementations, command processor 240 may process the command responsive to access storage device 130 by the first client having been granted.

In some implementations, storage device 130 may include or be a part of a single Universal Flash Storage (UFS). In such cases, controller 205 may include or be a part of a control circuit in a UFS HCI.

Illustrative Processes

Figure 4:
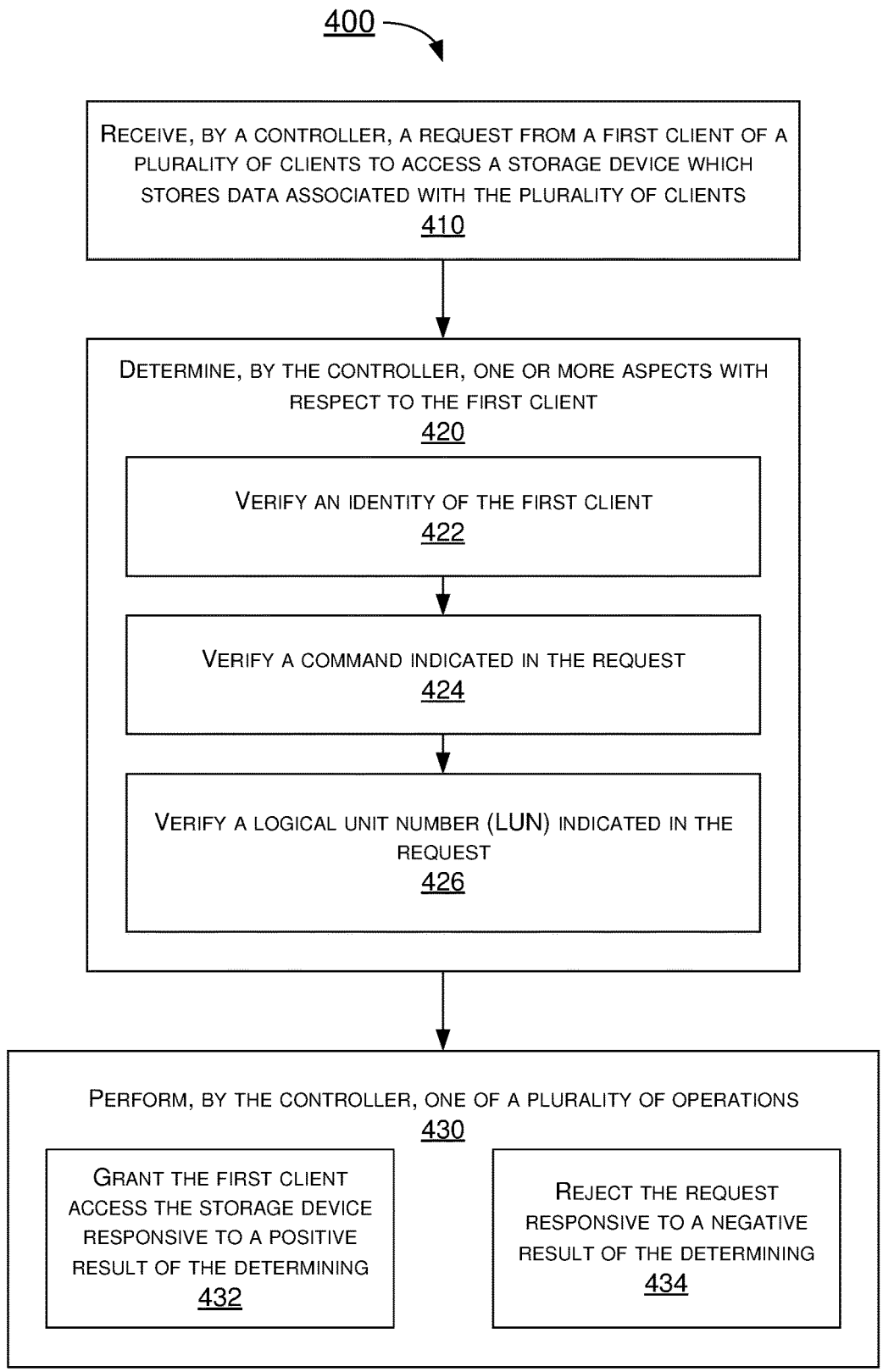
FIG. 4 is a flowchart of an example process in accordance with an implementation of the present disclosure.
Figure 5:
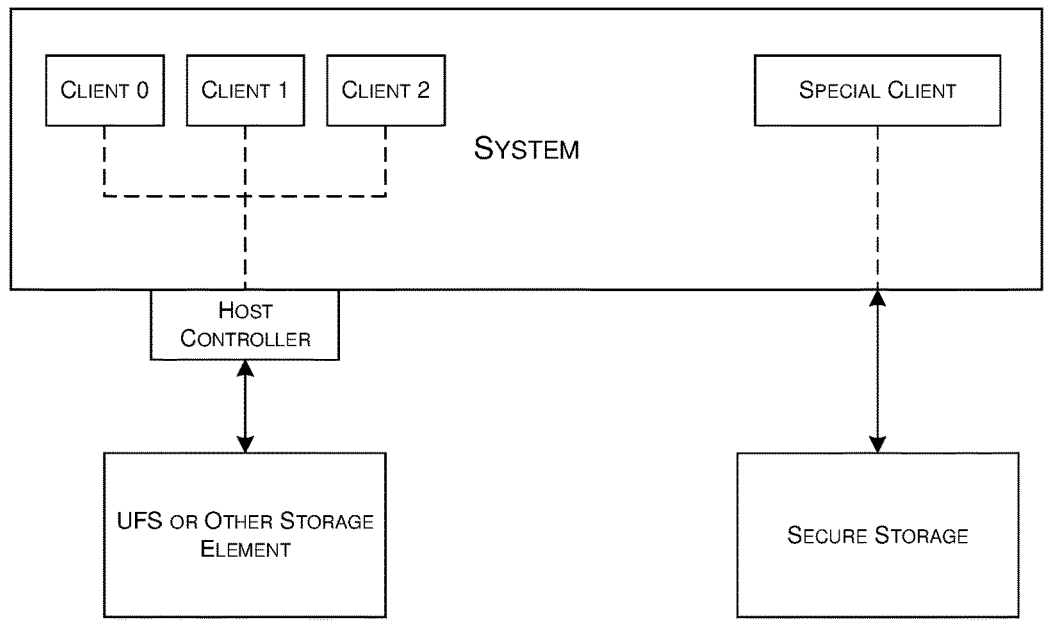
FIG. 5 is a diagram of conventional approaches.
Figure 5:
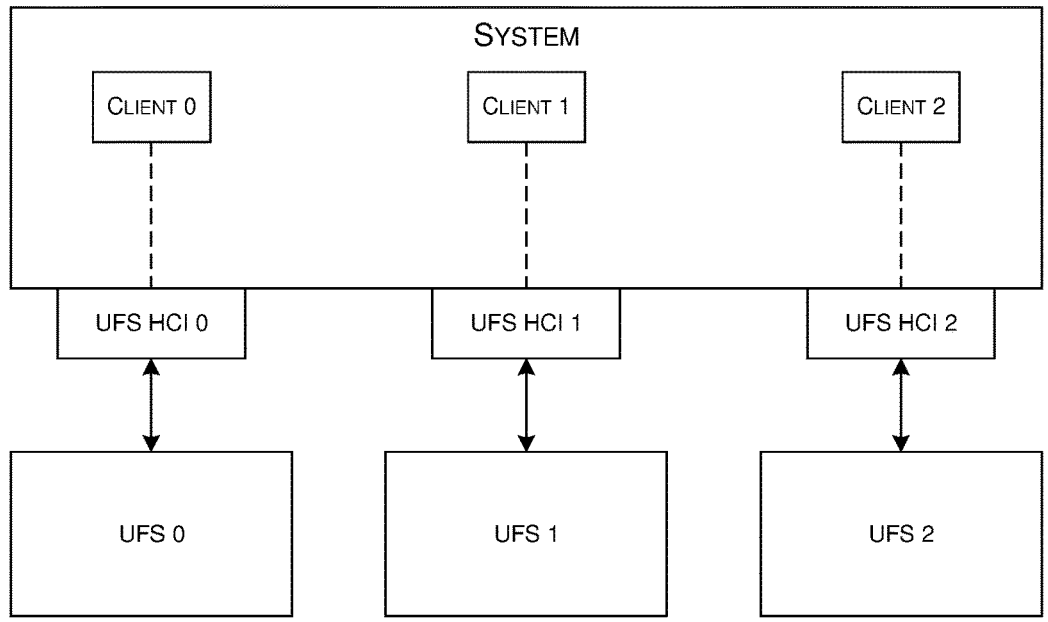

FIG. 4 illustrates an example process 400 in accordance with an implementation of the present disclosure. Process 400 may represent an aspect of implementing various proposed designs, concepts, schemes, systems and methods described above. More specifically, process 400 may represent an aspect of the proposed concepts and schemes pertaining to a security check system for access to a storage device. Process 400 may include one or more operations, actions, or functions as illustrated by one or more of blocks 410, 420 and 430, as well as sub-blocks 422, 424, 426, 432 and 434. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, the blocks/sub-blocks of process 400 may be executed iteratively. Process 400 may be implemented by or in apparatus 200 and scheme 300 as well as any variations thereof. Solely for illustrative purposes and without limiting the scope, process 400 is described below in the context of apparatus 200 being implemented as host controller 120 in environment 100. Process 400 may begin at block 410.

At 410, process 400 may involve user access control circuit 210 of controller 205 receiving a request from a first client (e.g., any of client 0, client 1 or client 2) of a plurality of clients of multi-client system 110 to access storage device 130 which stores data associated with the plurality of clients. Process 400 may proceed from 410 to 420.

At 420, process 400 may involve user access control circuit 210 determining one or more aspects with respect to the first client. In determining the one or more aspects with respect to the first client, process 400 may involve controller 205 performing certain operations represented by 422, 424 and 426. At 422, process 400 may involve user access control circuit 210 verifying an identity of the first client. At 424, process 400 may involve user access control circuit 210 verifying a command indicated in the request. At 426, process 400 may involve user partition control circuit 220 of controller 205 verifying a logical unit number (LUN) indicated in the request. Process 400 may proceed from 420 to 430.

At 430, process 400 may involve controller 205 performing one of a plurality of operations represented by 432 and 434. At 432, responsive to a positive result of the determining, process 400 may involve user partition control circuit 220 granting the first client access storage device 130. At 434, responsive to a negative result of the determining, process 400 may involve user partition control circuit 220 rejecting the request.

In some implementations, in verifying the identity of the first client, process 400 may involve user access control circuit 210 performing certain operations. For instance, process 400 may involve user access control circuit 210 identifying a user identification (UID) corresponding to a bus address of a bus of a plurality of buses through which the request is received. Additionally, process 400 may involve user access control circuit 210 identifying an initiator identification (IID) which is associated with the first client and indicated in the request. Moreover, process 400 may involve user access control circuit 210 comparing the UID and the IID. Furthermore, based on a result of the comparing, process 400 may involve user access control circuit 210 either: (a) determining that the identity of the first client is correct responsive to a match between the UID and the IID, or (b) determining that the identity of the first client is incorrect responsive to a mismatch between the UID and the IID.

In some implementations, in verifying the command indicated in the request, process 400 may involve user access control circuit 210 performing certain operations. For instance, process 400 may involve user access control circuit 210 verifying whether the command is among one or more permitted commands associated with the first client. Moreover, based on a result of the verifying, process 400 may involve user access control circuit 210 either: (a) determining that the command is permitted responsive to the command being one of the one or more permitted commands associated with the first client, or (b) determining that the command is not permitted responsive to the command not being one of the one or more permitted commands associated with the first client.

In some implementations, in verifying the LUN, process 400 may involve user partition control circuit 220 performing certain operations. For instance, process 400 may involve user partition control circuit 220 selecting a first checker from a plurality of checkers (e.g., checker 0, checker 1 and checker 2 in FIG. 3) which is associated with the first client. Additionally, process 400 may involve user partition control circuit 220 comparing, using the first checker, the LUN with a first secure map of a plurality of secure maps (e.g., secure map 0, secure map 1 and secure map 2 in FIG. 3) which is associated with the first client. In some implementations, each secure map of the plurality of secure maps may be unique to a respective one of the plurality of clients.

In some implementations, in verifying the LUN, process 400 may involve user partition control circuit 220 performing additional operations. For instance, process 400 may involve user partition control circuit 220 determining whether one of the plurality of partitions indicated by the LUN corresponds to one or more respective partitions of the plurality of partitions accessible by the first client. Moreover, based on a result of the comparing, process 400 may involve user partition control circuit 220 either: (a) determining that access to storage device 130 by the first client is to be granted responsive to a match between the LUN and the first secure map, or (b) determining that access to storage device 130 by the first client is to be rejected responsive to a mismatch between the LUN and the first secure map.

In some implementations, process 400 may also involve controller 205 performing additional operations. For instance, process 400 may also involve controller 205 creating the plurality of secure maps for the plurality of clients with each of the secure maps being unique to a respective one of the plurality of clients. Furthermore, process 400 may also involve controller 205 storing the plurality of secure maps in secure control map circuit 230.

In some implementations, in determining the one or more aspects with respect to the first client, process 400 may involve user access control circuit 210 determining that the first client is a supervisor which has administrative privilege. Correspondingly, in performing the one of the plurality of operations, process 400 may involve controller 205 performing certain operations. For instance, process 400 may involve user access control circuit 210 receiving one or more commands from the supervisor. Additionally, process 400 may involve user access control circuit 210 allowing the supervisor to modify one or more secure maps of the plurality of secure maps stored in secure control map circuit 230 based on the one or more commands. It is noteworthy that each secure map of the plurality of secure maps may be unique to a respective one of the plurality of clients and, accordingly, a first secure map (e.g., any of secure map 0, secure map 1 and secure map 2) of the plurality of secure maps may be used to verify the LUN.

In some implementations, process 400 may further involve command processor 240 of controller 205 processing the command responsive to access storage device 130 by the first client having been granted.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a controller, a request from a first client of a plurality of clients to access a storage device which stores data associated with the plurality of clients;
determining, by the controller, one or more aspects with respect to the first client, the determining comprising:
verifying an identity of the first client,
verifying a command indicated in the request, and
verifying a logical unit number (LUN) indicated in the request; and
performing, by the controller, one of a plurality of operations comprising:
granting the first client access the storage device responsive to a positive result of the determining, and
rejecting the request responsive to a negative result of the determining,
wherein the storage device is divided into a plurality of partitions to store respective data associated with each of the plurality of clients in one or more respective partitions of the plurality of partitions,
wherein at least one of the plurality of clients is a special client and at least one of the plurality of clients is a regular client,
wherein respective data associated with the special client is accessible by the special client but not by other clients of the plurality of clients, and
wherein respective data associated with the regular client is accessible by the regular client and one or more other clients of the plurality of clients.

2. The method of claim 1, wherein the verifying of the identity of the first client comprises:
identifying a user identification (UID) corresponding to a bus address of a bus of a plurality of buses through which the request is received;
identifying an initiator identification (IID) which is associated with the first client and indicated in the request;
comparing the UID and the IID; and
based on a result of the comparing:
determining that the identity of the first client is correct responsive to a match between the UID and the IID, or
determining that the identity of the first client is incorrect responsive to a mismatch between the UID and the IID.

3. The method of claim 1, wherein the verifying of the command indicated in the request comprises:
verifying whether the command is among one or more permitted commands associated with the first client; and
based on a result of the verifying:
determining that the command is permitted responsive to the command being one of the one or more permitted commands associated with the first client, or determining that the command is not permitted responsive to the command not being one of the one or more permitted commands associated with the first client.

4. The method of claim 1, wherein the verifying of the LUN comprises:
  selecting a first checker from a plurality of checkers which is associated with the first client; and
  comparing, using the first checker, the LUN with a first secure map of a plurality of secure maps which is associated with the first client,
  wherein each secure map of the plurality of secure maps is unique to a respective one of the plurality of clients.

5. The method of claim 4, wherein the verifying of the LUN further comprises:
  determining whether one of the plurality of partitions indicated by the LUN corresponds to one or more respective partitions of the plurality of partitions accessible by the first client; and
  based on a result of the comparing:
    determining that access to the storage device by the first client is to be granted responsive to a match between the LUN and the first secure map, or
    determining that access to the storage device by the first client is to be rejected responsive to a mismatch between the LUN and the first secure map.

6. The method of claim 4, further comprising:
  creating the plurality of secure maps for the plurality of clients with each of the secure maps being unique to a respective one of the plurality of clients; and
  storing the plurality of secure maps.

7. The method of claim 1, wherein the determining of the one or more aspects with respect to the first client comprises determining that the first client is a supervisor which has administrative privilege, and wherein the performing of the one of the plurality of operations comprises:
  receiving one or more commands from the supervisor; and
  modifying one or more secure maps of a plurality of secure maps based on the one or more commands,
  wherein each secure map of the plurality of secure maps is unique to a respective one of the plurality of clients, and
  wherein a first secure map of the plurality of secure maps is used to verify the LUN.

8. The method of claim 1, wherein the storage device comprises a single Universal Flash Storage (UFS), and wherein the controller comprises a control circuit in a UFS Host Controller Interface (HCI).

9. The method of claim 1, wherein each of the plurality of clients comprises a user or an operating system (OS) of a multi-user/multi-OS system.

10. The method of claim 1, further comprising:
  processing, by the controller, the command responsive to access the storage device by the first client having been.

11. An apparatus implementable in a Host Controller Interface (HCI), comprising:
  a controller comprising:
    a user access control circuit; and
    a user partition control circuit,
  wherein, during operation, the controller performs operations comprising:
    receiving, by the user access control circuit, a request from a first client of a plurality of clients to access a storage device which stores data associated with the plurality of clients;
    determining one or more aspects with respect to the first client, the determining comprising:
      verifying, by the user access control circuit, an identity of the first client,
      verifying, by the user access control circuit, a command indicated in the request, and
      verifying, by the user partition control circuit, a logical unit number (LUN) indicated in the request; and
    performing one of a plurality of operations comprising:
      granting the first client access the storage device responsive to a positive result of the determining, and
      rejecting the request responsive to a negative result of the determining,
  wherein the storage device is divided into a plurality of partitions to store respective data associated with each of the plurality of clients in one or more respective partitions of the plurality of partitions,
  wherein at least one of the plurality of clients is a special client and at least one of the plurality of clients is a regular client,
  wherein respective data associated with the special client is accessible by the special client but not by other clients of the plurality of clients, and
  wherein respective data associated with the regular client is accessible by the regular client and one or more other clients of the plurality of clients.

12. The apparatus of claim 11, wherein, in verifying the identity of the first client, the user access control circuit performs operations comprising:
  identifying a user identification (UID) corresponding to a bus address of a bus of a plurality of buses through which the request is received;
  identifying an initiator identification (IID) which is associated with the first client and indicated in the request;
  comparing the UID and the IID; and
  based on a result of the comparing:
    determining that the identity of the first client is correct responsive to a match between the UID and the IID, or
    determining that the identity of the first client is incorrect responsive to a mismatch between the UID and the IID.

13. The apparatus of claim 11, wherein, in verifying the command indicated in the request, the user access control circuit performs operations comprising:
  verifying whether the command is among one or more permitted commands associated with the first client; and
  based on a result of the verifying:
    determining that the command is permitted responsive to the command being one of the one or more permitted commands associated with the first client, or
    determining that the command is not permitted responsive to the command not being one of the one or more permitted commands associated with the first client.

14. The apparatus of claim 11, wherein, in verifying the LUN, the user partition control circuit performs operations comprising:
  selecting a first checker from a plurality of checkers which is associated with the first client; and
  comparing, using the first checker, the LUN with a first secure map of a plurality of secure maps which is associated with the first client, wherein each secure map of the plurality of secure maps is unique to a respective one of the plurality of clients.

15. The apparatus of claim 14, wherein, in verifying the LUN, the user partition control circuit further performs operations comprising:
   determining whether one of the plurality of partitions indicated by the LUN corresponds to one or more respective partitions of the plurality of partitions accessible by the first client; and
   based on a result of the comparing:
      determining that access to the storage device by the first client is to be granted responsive to a match between the LUN and the first secure map, or
      determining that access to the storage device by the first client is to be rejected responsive to a mismatch between the LUN and the first secure map.

16. The apparatus of claim 14, wherein the controller further comprises a secure control map circuit, and wherein, during operation, the controller further performs operations comprising:
   creating the plurality of secure maps for the plurality of clients with each of the secure maps being unique to a respective one of the plurality of clients; and
   storing, in the secure control map circuit, the plurality of secure maps.

17. The apparatus of claim 11, wherein, in determining the one or more aspects with respect to the first client, the controller determines that the first client is a supervisor which has administrative privilege, and wherein, in performing the one of the plurality of operations, the controller performs operations comprising:
   receiving one or more commands from the supervisor; and
   modifying one or more secure maps of a plurality of secure maps based on the one or more commands,
   wherein each secure map of the plurality of secure maps is unique to a respective one of the plurality of clients, and
   wherein a first secure map of the plurality of secure maps is used to verify the LUN.

18. The apparatus of claim 11, wherein each of the plurality of clients comprises a user or an operating system (OS) of a multi-user/multi-OS system.

19. The apparatus of claim 18, wherein the controller comprises a control circuit in a Universal Flash Storage (UFS) Host Controller Interface (HCI), and wherein the storage device comprises a single UFS.

20. The apparatus of claim 11, wherein the controller further comprises a command processor, and wherein, during operation, the command processor processes the command responsive to access the storage device by the first client having been.

\* \* \* \* \*